United States Patent
Selvaganapathy et al.

(10) Patent No.: US 11,425,682 B2
(45) Date of Patent: Aug. 23, 2022

(54) METHOD, SYSTEM AND APPARATUS TO ENHANCE PAGING RESOURCE ALLOCATION FOR GSM-BASED CELLULAR INTERNET OF THINGS SYSTEMS WITH CHANNEL CODING MODIFICATION

(71) Applicant: NOKIA SOLUTIONS AND NETWORKS OY, Espoo (FI)

(72) Inventors: Srinivasan Selvaganapathy, Bangalore (IN); Kari Niemelä, Oulu (FI); Jürgen Hoffman, Merching (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/774,677

(22) PCT Filed: Oct. 27, 2016

(86) PCT No.: PCT/FI2016/050754
§ 371 (c)(1),
(2) Date: May 9, 2018

(87) PCT Pub. No.: WO2017/081362
PCT Pub. Date: May 18, 2017

(65) Prior Publication Data
US 2018/0332562 A1    Nov. 15, 2018

(30) Foreign Application Priority Data
Nov. 9, 2015   (IN) ........................... 6052/CHE/2015

(51) Int. Cl.
*H04W 68/02*  (2009.01)
*H04L 5/00*  (2006.01)
(Continued)

(52) U.S. Cl.
CPC .......... *H04W 68/02* (2013.01); *H04L 5/0053* (2013.01); *H04W 52/0229* (2013.01); *H04W 72/042* (2013.01)

(58) Field of Classification Search
CPC ............. H04W 68/02; H04W 52/0229; H04W 72/042; H04L 5/0053
See application file for complete search history.

(56) References Cited

U.S. PATENT DOCUMENTS

| | | | |
|---|---|---|---|
| 2015/0382294 A1* | 12/2015 | Schliwa-Bertling | H04W 52/0229 370/311 |
| 2016/0338006 A1* | 11/2016 | Lee | H04W 52/0229 |
| 2018/0007658 A1* | 1/2018 | Shen | H04W 68/02 |

OTHER PUBLICATIONS

International Search Report & Written Opinion dated Jan. 30, 2017 corresponding to International Patent Application No. PCT/FI2016/050754.

(Continued)

*Primary Examiner* — Marisol Figueroa
(74) *Attorney, Agent, or Firm* — Squire Patton Boggs (US) LLP (57) ABSTRACT

There is provided a method comprising receiving a paging transmission at a user device of a first coverage class, the paging transmission comprising a least one encoded paging message, the at least encoded one paging message associated with a respective coverage class and determining if the at least one paging message is associated with the first coverage class and, if so, receiving and decoding at least the paging message associated with the first coverage class.

11 Claims, 9 Drawing Sheets

620 — Receiving a paging transmission at a user device of a first coverage class, the paging transmission comprising a least one encoded paging message, the at least encoded one paging message associated with a respective coverage class 640 — Determining if the at least one paging message is associated with the first coverage class and, if so, receiving and decoding at least the paging message associated with the first coverage class (51) Int. Cl.
*H04W 52/02* (2009.01)
*H04W 72/04* (2009.01)

(56) References Cited

OTHER PUBLICATIONS

Samsung: "pCR 45.820 NB M2M—Paging procedure device," 3GPP Draft; GP-150383, 3GPP GERAN2 Meeting #66, Vilnius, Lithuania, May 25-28, 2015.
3GPP TR 45.820 V1.2.1 (May 2015), Technical Report, 3rd Generation Partnership Project; Technical Specification Group GSM/EDGE Radio Access Network; Cellular System Support for Ultra Low Complexity and Low Throughput Internet of Things; (Release 13); 3GPP Draft, May 22, 2015, XP050969608.
Nokia Networks: "On EC-PCH Design and Enhancements," 3GPP Draft; GP-151133, 3GPP TSG GERAN #68, Anaheim, CA, USA, Nov. 16-20, 2015, XP051039226.
Ericsson LM: "EC-GSM—Dynamic Coverage Class Update," 3GPP Draft; GPC150077, 3GPP TSG GERAN Ad Hoc#1 on FS_IoT_LC, Sofia Antipolis, France, February 2-5, 2015, XP050931410.
Samsung: "NB M2M—Discussions on mobility support," 3GPP Draft; GP-150384, 3GPP GERAN2 Meeting #66, Vilnius, Lithuania, May 25-28, 2015, XP050977423.
Indian Office Action corresponding to IN Application No. 6052/CHE/2015, dated Jun. 29, 2021.

\* cited by examiner

METHOD, SYSTEM AND APPARATUS TO ENHANCE PAGING RESOURCE ALLOCATION FOR GSM-BASED CELLULAR INTERNET OF THINGS SYSTEMS WITH CHANNEL CODING MODIFICATION

FIELD

The present application relates to a method, apparatus, system and computer program and in particular but not exclusively to enhanced paging resource allocation for GSM based cellular Internet-of-Things CIoT system with channel coding modification.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE) or mobile station (MS). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. Certain releases of 3GPP LTE (e.g., LTE Rel-11, LTE Rel-12, LTE Rel-13) are targeted towards LTE-Advanced (LTE-A). LTE-A is directed towards extending and optimising the 3GPP LTE radio access technologies. Another proposed communication system is a 5G network or a communication network which comprises enhancements for machine type communications or to support services for the Internet of Things. The deployed communication technologies of e.g., 3GPP GSM (Global Mobile System) and EGPRS (Edge Global Packet Radio System) or 3GPP LTE, may be enhanced to satisfy the specific requirements of the IoT services and their related user equipments or mobile stations, known as IoT devices. Those IoT devices may communicate via the radio link of the communication network to the service provider/server

SUMMARY

In a first aspect there is provided a method comprising receiving a paging transmission at a user device of a first coverage class, the paging transmission comprising a least one encoded paging message, the at least encoded one paging message associated with a respective coverage class and determining if the at least one paging message is associated with the first coverage class and, if so, receiving and decoding at least the paging message associated with the first coverage class.

The paging message transmission may comprise a dual encoded paging message, each encoded part of the paging message associated with a respective coverage class.

The paging transmission may comprise a sequence of data symbols associated with a respective coverage class.

Determining may comprise determining if the sequence of data symbols is associated with the respective coverage class and, if so, receiving and decoding said paging message and, if not, at least one of stopping receiving remaining paging messages of the paging transmission, stopping decoding of paging message, and switching operation to an idle mode.

The sequence of data symbols may comprise a training sequence code associated with the respective coverage class.

A plurality of encoded paging messages may be multiplexed in a resource block used for the paging transmission.

The multiplexing may comprise orthogonal sub channel multiplexing.

The paging transmission may comprise an indication that the paging transmission comprises a plurality of encoded paging messages multiplexed in the block.

The indication may include an indication of the respective coverage classes with which the plurality of encoded messages are associated.

The indication may comprise at least one of a training sequence code and a stealing bit.

In a second aspect there is provided a method comprising providing a paging transmission to a user device of a first coverage class, the paging transmission comprising a least one encoded paging message, the at least one encoded paging message associated with a respective coverage class.

The paging transmission may comprise a dual encoded paging message, each encoded part of the paging message associated with a respective coverage class.

The paging transmission may comprise a sequence of data symbols associated with a respective coverage class.

The sequence of data symbols may comprise a training sequence code associated with the respective coverage class.

A plurality of encoded paging messages may be multiplexed in a resource block used for the paging transmission.

The multiplexing may comprise orthogonal sub channel multiplexing.

The method may comprise providing an indication that the paging transmission comprises a plurality of encoded paging messages multiplexed in the block.

The indication may include an indication of the respective coverage classes with which the plurality of encoded messages are associated.

The indication may comprise at least one of a training sequence code and a stealing bit.

In a third aspect there is provided an apparatus, said apparatus comprising means for receiving a paging transmission at a user device of a first coverage class, the paging transmission comprising a least one encoded paging message, the at least encoded one paging message associated with a respective coverage class and means for determining if the at least one paging message is associated with the first coverage class and means for, if so, receiving and decoding at least the paging message associated with the first coverage class.

The paging message transmission may comprise a dual encoded paging message, each encoded part of the paging message associated with a respective coverage class.

The paging transmission may comprise a sequence of data symbols associated with a respective coverage class.

Means for determining may comprise means for determining if the sequence of data symbols is associated with the respective coverage class and means for, if so, receiving and decoding said paging message and means for, if not, at least one of stopping receiving remaining paging messages of the paging transmission, stopping decoding of paging message, and switching operation to an idle mode.

The sequence of data symbols may comprise a training sequence code associated with the respective coverage class.

A plurality of encoded paging messages may be multiplexed in a resource block used for the paging transmission.

The multiplexing may comprise orthogonal sub channel multiplexing.

The paging transmission may comprise an indication that the paging transmission comprises a plurality of encoded paging messages multiplexed in the block.

The indication may include an indication of the respective coverage classes with which the plurality of encoded messages are associated.

The indication may comprise at least one of a training sequence code and a stealing bit.

In a fourth aspect, there is provided an apparatus, said apparatus comprising means for providing a paging transmission to a user device of a first coverage class, the paging transmission comprising a least one encoded paging message, the at least one encoded paging message associated with a respective coverage class.

The paging transmission may comprise a dual encoded paging message, each encoded part of the paging message associated with a respective coverage class.

The paging transmission may comprise a sequence of data symbols associated with a respective coverage class.

The sequence of data symbols may comprise a training sequence code associated with the respective coverage class.

A plurality of encoded paging messages may be multiplexed in a resource block used for the paging transmission.

The multiplexing may comprise orthogonal sub channel multiplexing.

The apparatus may comprise means for providing an indication that the paging transmission comprises a plurality of encoded paging messages multiplexed in the block.

The indication may include an indication of the respective coverage classes with which the plurality of encoded messages are associated.

The indication may comprise at least one of a training sequence code and a stealing bit.

In a fifth aspect there is provided an apparatus comprising at least one processor and at least one memory including a computer program code, the at least one memory and the computer program code configured to, with the at least one processor, cause the apparatus at least to receive a paging transmission at a user device of a first coverage class, the paging transmission comprising a least one encoded paging message, the at least encoded one paging message associated with a respective coverage class and determine if the at least one paging message is associated with the first coverage class and, if so, receive and decode at least the paging message associated with the first coverage class.

The paging message transmission may comprise a dual encoded paging message, each encoded part of the paging message associated with a respective coverage class.

The paging transmission may comprise a sequence of data symbols associated with a respective coverage class.

The apparatus may be configured to determine if the sequence of data symbols is associated with the respective coverage class and, if so, receive and decode said paging message and, if not, at least one of stop receiving remaining paging messages of the paging transmission, stop decoding of paging message, and switch operation to an idle mode.

The sequence of data symbols may comprise a training sequence code associated with the respective coverage class.

A plurality of encoded paging messages may be multiplexed in a resource block used for the paging transmission.

The multiplexing may comprise orthogonal sub channel multiplexing.

The paging transmission may comprise an indication that the paging transmission comprises a plurality of encoded paging messages multiplexed in the block.

The indication may include an indication of the respective coverage classes with which the plurality of encoded messages are associated.

The indication may comprise at least one of a training sequence code and a stealing bit.

In a sixth aspect there is provided an apparatus comprising at least one processor and at least one memory including a computer program code, the at least one memory and the computer program code configured to, with the at least one processor, cause the apparatus at least to providing a paging transmission to a user device of a first coverage class, the paging transmission comprising a least one encoded paging message, the at least one encoded paging message associated with a respective coverage class.

The paging transmission may comprise a dual encoded paging message, each encoded part of the paging message associated with a respective coverage class.

The paging transmission may comprise a sequence of data symbols associated with a respective coverage class.

The sequence of data symbols may comprise a training sequence code associated with the respective coverage class.

A plurality of encoded paging messages may be multiplexed in a resource block used for the paging transmission.

The multiplexing may comprise orthogonal sub channel multiplexing.

The apparatus may be configured to provide an indication that the paging transmission comprises a plurality of encoded paging messages multiplexed in the block.

The indication may include an indication of the respective coverage classes with which the plurality of encoded messages are associated.

The indication may comprise at least one of a training sequence code and a stealing bit.

In a seventh aspect there is provided a computer program embodied on a non-transitory computer-readable storage medium, the computer program comprising program code for controlling a process to execute a process, the process comprising receiving a paging transmission at a user device of a first coverage class, the paging transmission comprising a least one encoded paging message, the at least encoded one paging message associated with a respective coverage class and determining if the at least one paging message is associated with the first coverage class and, if so, receiving and decoding at least the paging message associated with the first coverage class.

The paging message transmission may comprise a dual encoded paging message, each encoded part of the paging message associated with a respective coverage class.

The paging transmission may comprise a sequence of data symbols associated with a respective coverage class.

Determining may comprise determining if the sequence of data symbols is associated with the respective coverage class and, if so, receiving and decoding said paging message and, if not, at least one of stopping receiving remaining paging messages of the paging transmission, stopping decoding of paging message, and switching operation to an idle mode.

The sequence of data symbols may comprise a training sequence code associated with the respective coverage class.

A plurality of encoded paging messages may be multiplexed in a resource block used for the paging transmission.

The multiplexing may comprise orthogonal sub channel multiplexing.

The paging transmission may comprise an indication that the paging transmission comprises a plurality of encoded paging messages multiplexed in the block.

The indication may include an indication of the respective coverage classes with which the plurality of encoded messages are associated.

The indication may comprise at least one of a training sequence code and a stealing bit.

In an eighth aspect there is provided a computer program embodied on a non-transitory computer-readable storage medium, the computer program comprising program code for controlling a process to execute a process, the process comprising providing a paging transmission to a user device of a first coverage class, the paging transmission comprising a least one encoded paging message, the at least one encoded paging message associated with a respective coverage class.

The paging transmission may comprise a dual encoded paging message, each encoded part of the paging message associated with a respective coverage class.

The paging transmission may comprise a sequence of data symbols associated with a respective coverage class.

The sequence of data symbols may comprise a training sequence code associated with the respective coverage class.

A plurality of encoded paging messages may be multiplexed in a resource block used for the paging transmission.

The multiplexing may comprise orthogonal sub channel multiplexing.

The process may comprise providing an indication that the paging transmission comprises a plurality of encoded paging messages multiplexed in the block.

The indication may include an indication of the respective coverage classes with which the plurality of encoded messages are associated.

The indication may comprise at least one of a training sequence code and a stealing bit.

In a ninth aspect there is provided a computer program product for a computer, comprising software code portions for performing the steps of the method of the first aspect and/or the second aspect when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
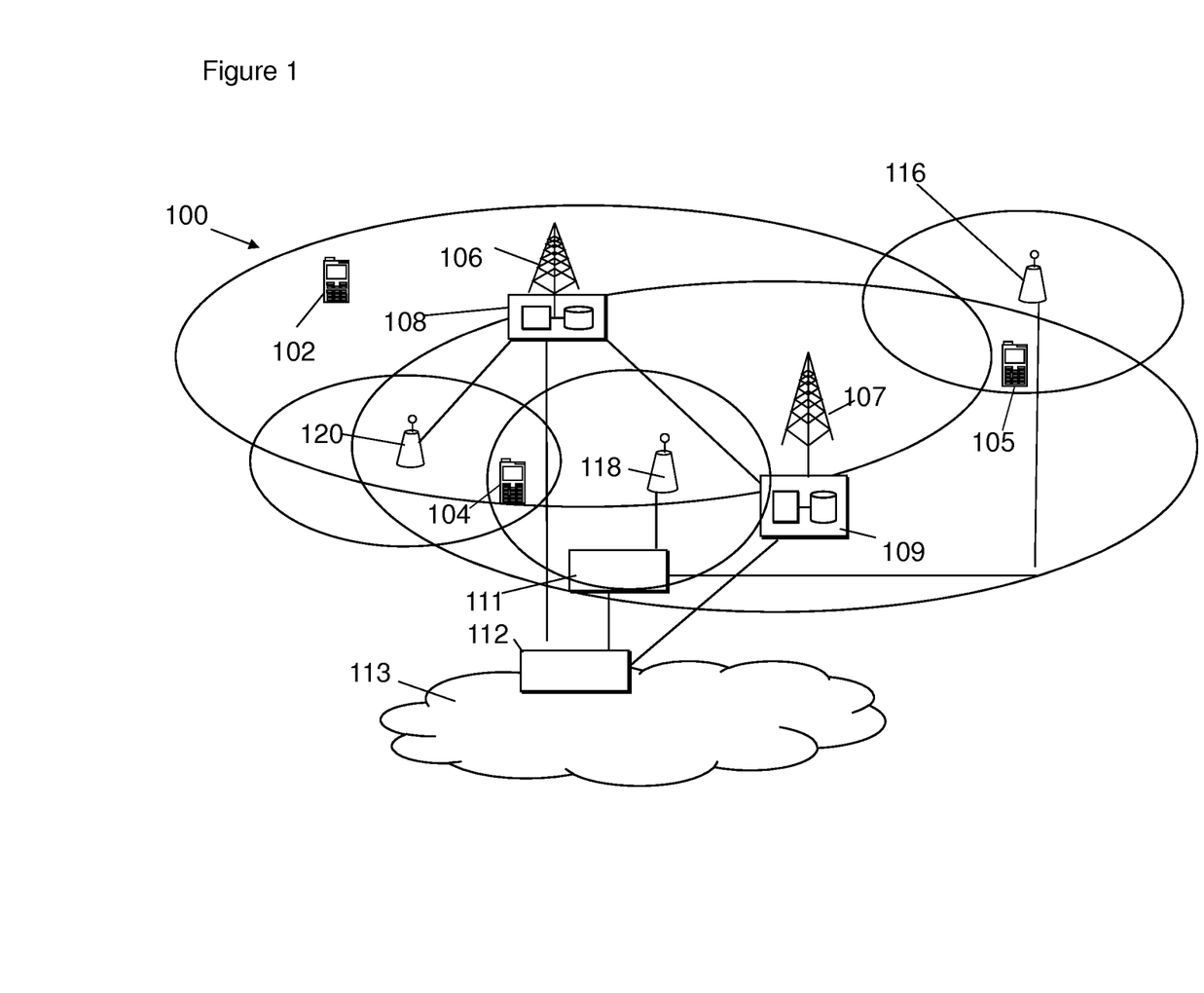
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations (BTS, NodeB (NB), enhanced NodeB (eNB)) are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller (RNC). In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller or a base station controller (BSC).

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
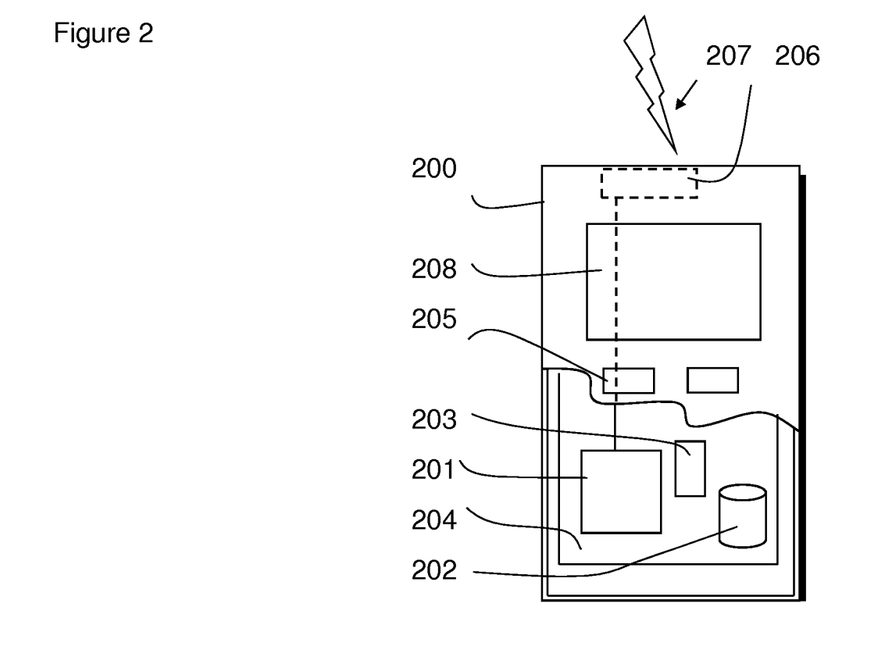
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving (e.g., a receiver) and may transmit signals via appropriate apparatus for transmitting radio signals (e.g., a transmitter). In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. A user device 200 may be in an idle mode which describes an operation of the user device which targets at a reduced energy consumption or at an improved lifetime of a battery 203 of the user device 200 and ensuring operation within the communication network. Examples of an idle mode comprise operation of the user device in power save mode or discontinues reception mode (DRX) defined by 3GPP specification.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on. Signalling mechanisms and procedures, which may enable a device to address in-device coexistence (IDC) issues caused by multiple transceivers, may be provided with help from the LTE network. The multiple transceivers may be configured for providing radio access to different radio technologies.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile network architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of a radio access system comprise those provided by base stations of systems that are based on technologies such as wireless local area network (WLAN) and/or WiMax (Worldwide Interoperability for Microwave Access). A base station can provide coverage for an entire cell or similar radio service area.

Machine type communication is expected to provide significant growth opportunities in the 3GPP ecosystem. Of various applications of Machine type communication (MTC) or IoT (Internet of things), one application may be the deployment of low cost low throughput devices in extended coverage conditions. This application may be suitable for sensors or smart meters deployed in basement or indoor coverage conditions.

In 3GPP Rel-13, air interface enhancements have been considered for GSM/EDGE networks within the Cellular IoT feasibility study [3GPP TR 45.820, v.13.0.0] to support low throughput devices in extended coverage with the following key targets: 20 dB additional maximum coupling loss (MCL) compared to GPRS coverage, support of massive number of devices in a cell (approximately 51 000 devices per cell site sector), extended battery lifetime of 10 years and lower complexity than GPRS devices with minimum throughput of 160 bps at extreme coverage conditions.

The target devices have stationary to low mobility conditions. One candidate solution is EC-GSM (Extended coverage GSM) or EC-EGPRS (Extended coverage Edge Global Packet Radio System).

In legacy GPRS system, a paging message is sent using the Paging Control Channel (PCCH) logical channel using resources for a specific paging group to which the mobile station (MS) is assigned. The exact location of the paging group in which the paging message is to be sent may be determined based on the configured discontinuous reception (DRX) cycle, the total available paging resource per BCCH multiframe and the international mobile subscriber identity (IMSI) of the MS. Thus, multiple MS in a cell typically belong to one paging group and listen to the same paging resource on the PCCH. Each MS will wake up on its paging group occasion, receive the paging message in the paging transmission (which may comprise one or more paging bursts) and decode the paging message to check the presence of an identifier (IMSI or temporary mobile subscriber identities (TMSI)) associated with the MS in the paging message.

A paging message is encoded into data symbols and transmitted in a series of paging bursts, called a paging transmission.

A burst comprises user data and control data. Control data of a paging burst may comprises e.g., a training sequence code for signal detection in the received bursts which allows channel estimation and determination of the user data inside the paging burst and/or a stealing flag which may be a bit which indicates whether a part of the user data of the burst is replaced by signalling data.

For extended coverage scenarios, to improve the receiver sensitivity performance of mobile stations, i.e. Cellular IoT devices ("device"), the paging transmission needs to be repeated multiple times so that the paging message can be decoded successfully by combining the first transmission and the repetitions.

EC-GSM introduces the coverage class (CC) concept to differentiate devices in different coverage conditions. The number of paging repetitions and resources for transmission of the paging message is decided based on the coverage class of the addressed device in the respective link direction, i.e. the downlink coverage class. The worse the coverage condition of the addressed device, the more robust the downlink coverage class needs to be associated with a higher number of repetitions of the paging message. In the following the downlink coverage class is referred to as coverage class.

In the current EC-GSM design, a device identifies first its paging group as per the existing above mentioned procedure, and thereafter the resource for the paging blocks to be monitored are determined based on the coverage class of the device. The coverage class of the device may be provided by the network to the device.

The following relates to enhancements of EC-GSM, and in particular to the EC-PCH design and resource allocations.

Figure 3:
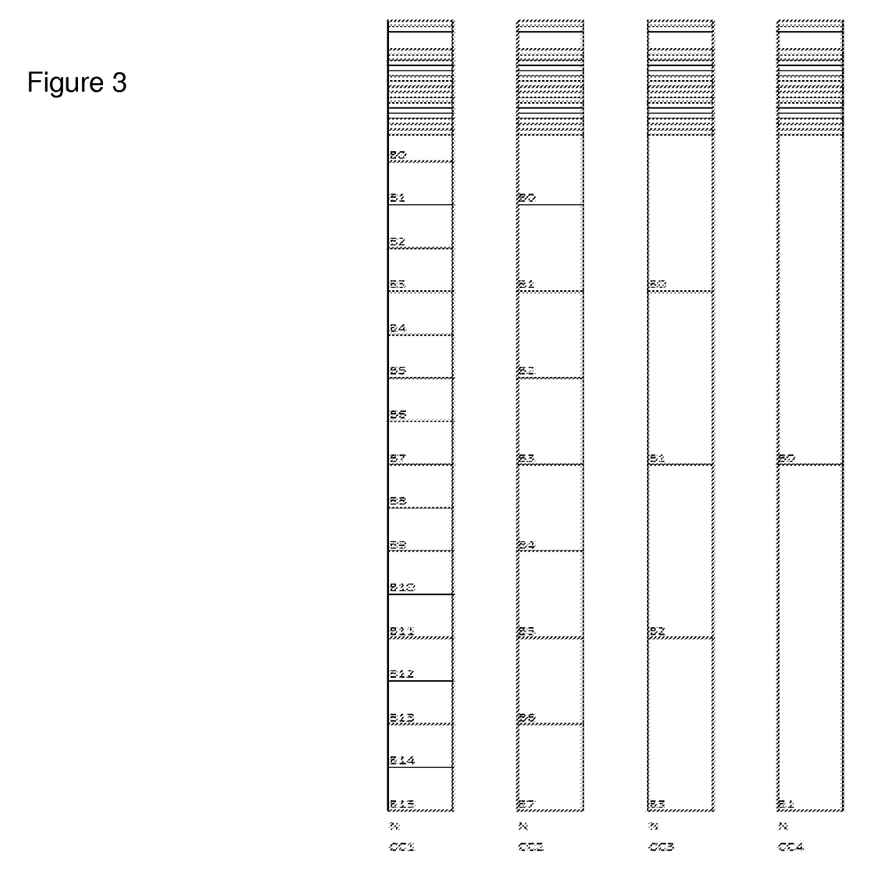
FIG. 3 shows a schematic diagram of example paging blocks.

FIG. 3 indicates the resource allocation for EC-PCH for different coverage class users. 16 paging groups are present within one BCCH (Broadcast Control Channel) multiframe (51-multiframe). Across 4*51-multiframes, 64 such paging groups are available. This means within 4*51-multiframes, it is possible to page for 64 devices in coverage class 1 (a device in coverage class 1 has equivalent coverage condition to a device in normal coverage). The number of devices which can be paged is reduced for higher coverage classes (i.e. devices with worse coverage condition than those in lower coverage classes, e.g. coverage class 1 CC1). For instance within 4*51-multiframes only 2 devices belonging to CC4 can be paged.

The main restriction of the above resource allocation is the blocking of paging messages to devices belonging to lower coverage classes (e.g. CC1 or CC2), when the higher coverage class devices belonging to higher coverage classes (e.g. CC3 or CC4) are scheduled during the same DRX cycle.

Figure 4:
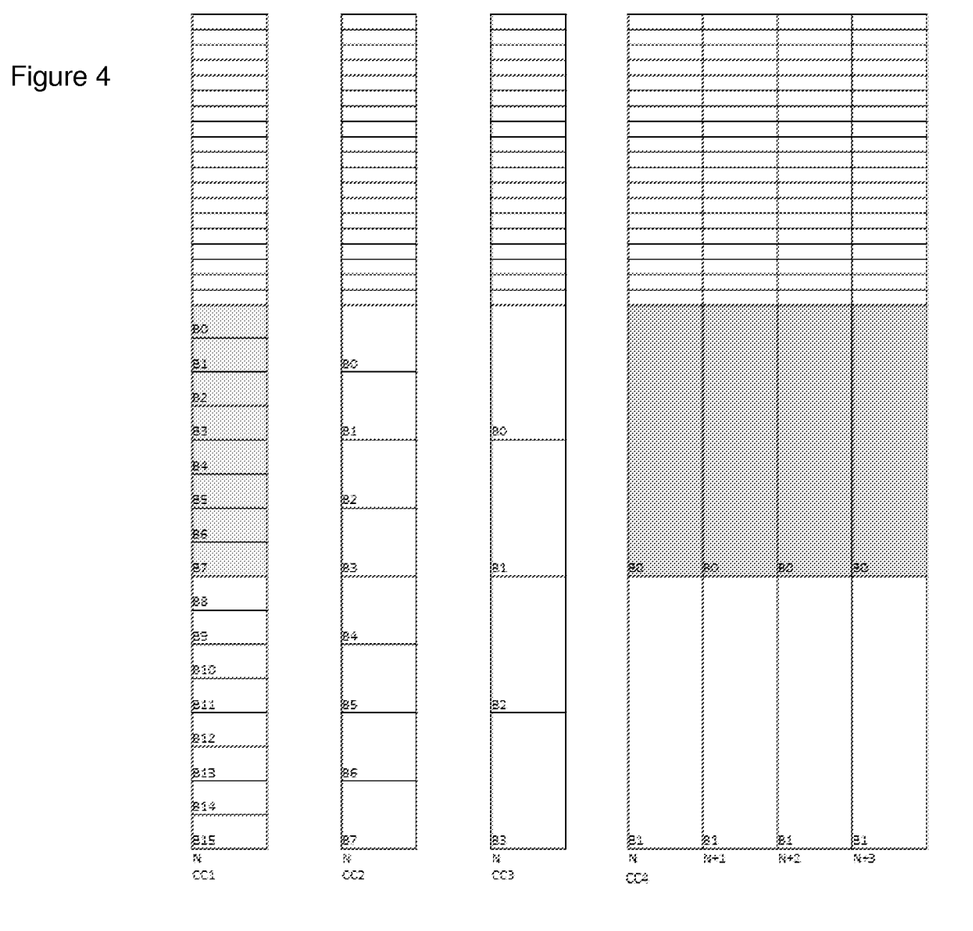
FIG. 4 shows a schematic diagram of example paging blocks with a paging message received for users of CC4.

This restriction is illustrated in FIG. 4. When a base station subsystem (BSS) receives a paging message for a device belonging to CC4 it is not possible to schedule any device belonging to a lower coverage class whose paging group falls into the paging resource for the device in CC4. In FIG. 4, since the device belonging to CC4 is scheduled in B0 of CC4, paging in paging groups B0 . . . B7 towards devices belonging to CC1 in 4*51-multiframes cannot be scheduled.

Even though a paging message in GPRS can carry 2 Packet Temporary Mobile Subscriber Identities (P-TMSI), the paging message will allow only one more device to be scheduled along with the device belonging to CC4 in this paging resource.

The above depicted problem may result in blocking of paging messages towards devices in better coverage condition, due to paging towards devices in extreme or worse coverage condition consuming a higher amount of paging resource.

Higher coverage class users may also have an impact on paging channel signal failure. If a device fails to decode its paging channel at its paging occasion, it will result in decrementing the Downlink Signalling Counter (DSC) value thus leading to DSC=0 indicating downlink signaling failure. This indication may be used to trigger cell reselection as specified in TS 45.008 and may result in additional battery consumption for executing cell reselection with the network.

In EC-GSM, if a device belonging to a higher coverage class (e.g. CC3 or CC4) is scheduled for paging, the device attempts to IQ/chase combine all the bursts in all the radio blocks as defined by its coverage class. That is, the device can combine the received bursts at the receiver front-end itself (IQ combining) without any pre-processing or can combine the output of channel equalisation after receiver pre-processing (chase combining).

In both cases the actual the received signal is combined without knowing the actual content of each burst. So if received bursts have different contents, this combining will result in failure If the BSS schedules consecutive paging messages to multiple lower coverage class devices using these radio blocks, the device belonging to the higher coverage class attempts to IQ/chase combine these radio blocks and decode them based on the combined output. However, as different devices are scheduled in different radio blocks, this combining may not add constructively thus resulting in a decoding failure for the device belonging to the higher coverage class. This decoding failure will be considered in the DSC determination. But this failure is not due to any degradation in downlink signal quality, being the purpose of the DSC procedure, but because of the fact that devices belonging to different coverage classes are multiplexed on the EC-PCH, i.e. that lower coverage class devices are addressed in the paging resources which are also monitored by devices belonging to a higher coverage class.

If this problem is not solved, there may be more chances for devices of higher coverage class declaring DSC in spite of the actual coverage condition.

Figure 5:
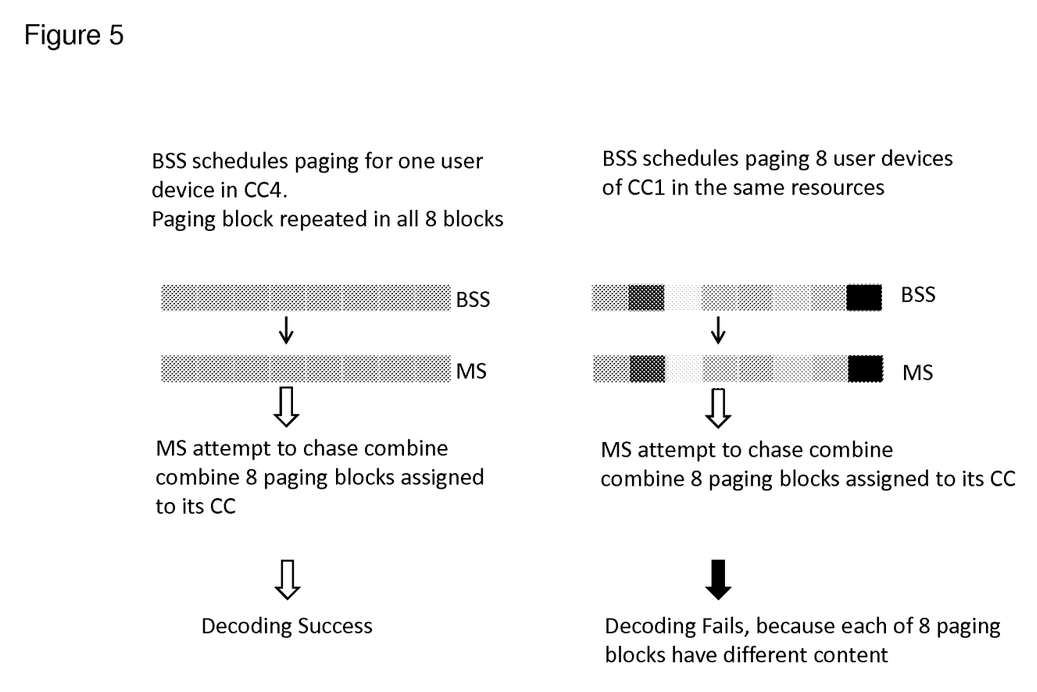
FIG. 5 shows a schematic diagram of example paging blocks at a BSS and a MS.

FIG. 5 illustrates this issue. A device belonging to CC4 is assigned to look into B0 as mentioned in the above for monitoring its paging message. Within B0 block-group, there are 8 paging blocks available. The device belonging to CC4 will attempt to chase combine the bursts from all these 8 blocks and proceed with channel decoding. If the BSS receives paging messages from SGSN for devices belonging to CC1, the paging messages will be scheduled in these blocks as U1→B0, U2→B31 . . . , U8→B7. The device belonging to CC4 will attempt to combine these blocks B0, B1 . . . B7 and since each block contains different information, the combining will result in a decoding failure.

When a device blindly combines all the assigned paging blocks for its coverage class, decoding failure may result if at this moment the base station subsystem (BSS) does not have a paging message for this device (i.e. a device of this coverage class) but for devices belonging to lower coverage classes.

This problem may be addressed by an example implementation of the subsequently described embodiments.

Figure 6:
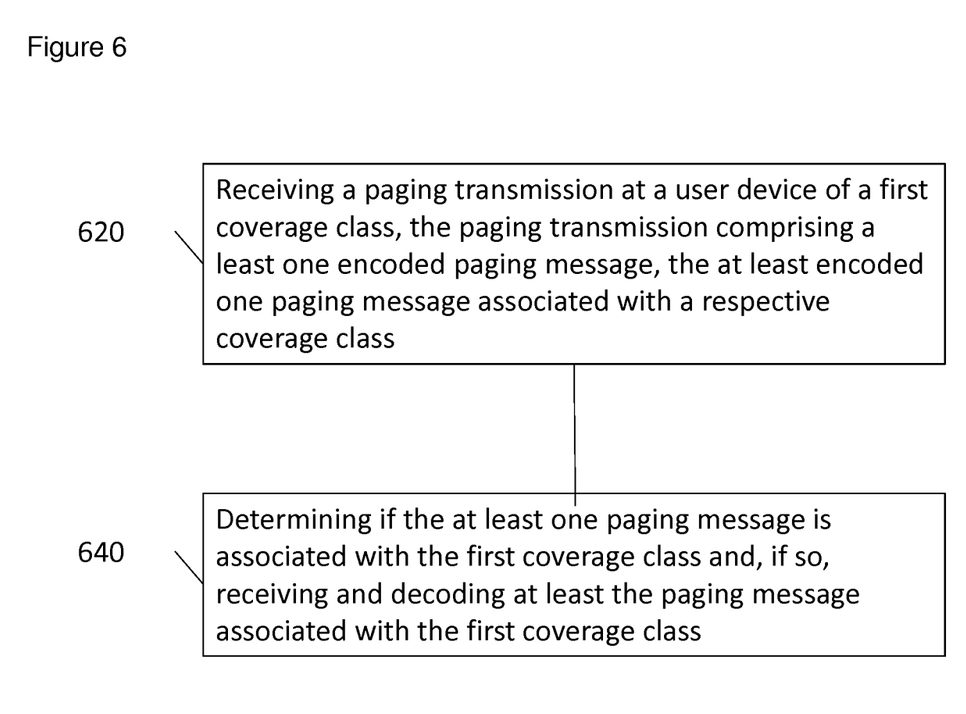
FIG. 6 shows a flowchart of an example method.

FIG. 6 shows a flowchart of a method according to an embodiment. In a first step 620, the method comprises receiving a paging transmission at a user device of a first coverage class, the paging transmission comprising a least one encoded paging message, the at least encoded one paging message associated with a respective coverage class.

In a second step 640, the method comprises determining if the at least one paging message is associated with the first coverage class and, if so, receiving and decoding at least the paging message associated with the first coverage class.

The paging transmission may comprise a dual encoded paging message, each encoded part of the paging message associated with a respective coverage class. That is, the channel coding scheme of a EC-PCH message may be modified to allow independent decoding of two P-TMSIs. The paging message may be divided into two parts and for each part separate parity bits are added and encoded. The paging burst is formed by concatenating the encoded bits of two parts Dual encoding within single message allows multiplexing of users of different coverage classes each requires different amount of repetitions in the same message. Modification to the paging scheduling in EC-GSM system using channel encoding to schedule paging messages for users for different coverage classes together. For example, it is possible to schedule one CC4 P-TMSI and 32 CC1 P-TMSI together in the interval of 4*51 multiframes with this invention compared to only 2 P-TMSI for the whole interval in existing system In paging scenarios which have P-TMSI assigned, the solution may address the issues for P-TMSI based paging.

Alternatively, or in addition, shorter paging messages can be formed which can be fit into one 58 bits of burst, so that within single burst two such messages may be multiplexed.

With this scheme it is possible to multiplex users of different coverage class in a single paging block since each message can be repeated independently as per its coverage class. Consider a scenario, where the base station receives a paging message for the device belonging to CC4 and also paging messages for 8 devices belonging to coverage class 1 at the time of page scheduling.

A BSS forms 8 paging messages as per the above mentioned message structure and channel coding. With the above channel coding, in all 8 paging messages the first message part may comprise RLC-Header and Message-type and P-TMSI of the device belonging to CC4 and the second message part is filled with P-TMSI of each device belonging to CC1 addressed in the paging block.

In paging block-I, the paging message will contain: P-TMSI(CC4 device)+P-TMSI-B0(CC1 device) and in paging block 8 the message will contain P-TMSI(CC4 device)+P-TMSI-B7(CC1 device).

A receiver at a device belonging to CC4 will IQ/chase combine the encoded bits of above 8 messages and attempt to decode. The decoding will succeed for Message part-I where the P-TMSI of CC4 is placed. Because this part is repeated in the same position in all the 32 paging messages. Decoding will not succeed for the other message part, because the IQ/chase combining here combines different encoded bits in each of the 32 paging blocks.

A receiver at a device belonging to CC1 for all 8 devices will succeed for both message parts of the paging block. Devices belonging to CC1 are in better coverage condition and can decode both message parts successfully with single transmission.

Based on the above example, it is evident that a channel coding scheme ensuring the independent encoding of two or more message parts of the paging message, may allow scheduling of devices belonging to a lower coverage class along with paging a device belonging to a higher coverage class, thus removing the above mentioned restriction of not supporting concurrent paging of devices in lower coverage classes when a device belonging to a higher coverage class is scheduled.

Figure 7:
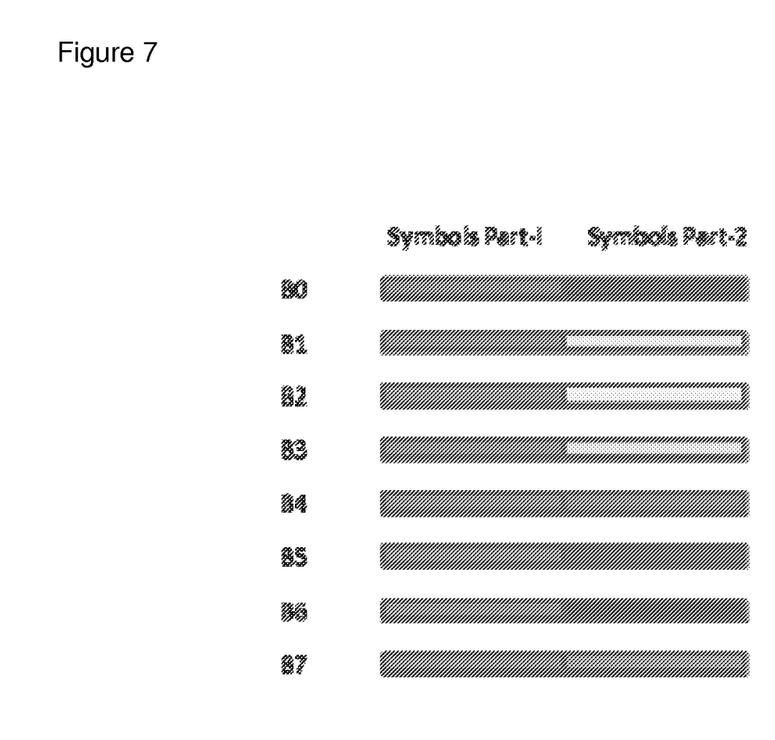
FIG. 7 shows a schematic diagram of symbols of bursts of a paging block.

FIG. 7 illustrates the symbols of the transmissions or bursts of EC-PCH blocks when multiplexing of CC1 and CC4 users. In this case 8 different paging messages will be scheduled from BSS in each of the blocks of 51 multi-frame.

These paging messages include P-TMSI of user of CC4 in first part of the message in all messages. The second part of the message will contain P-TMSI of CC1 user belonging to different blocks.

Receiver at UE (CC4) will combine all the symbols across 8 blocks and attempt to decode. The decoding will succeed for part-I because here the combining adds up as the contents are same in all blocks. The decoding will fail for part-2 where the contents are different. Receiver at UE (CC1) will be able to decode both parts of the message as it is in better channel condition and process the message if the received P-TMSI matches.

In another embodiment, paging messages to devices of different coverage classes may be sent using different (i.e. orthogonal) training sequence codes (TSC) assigned by the BSS. The mapping of a coverage class to a TSC may be provided to a user device via system information or may be hard coded in the specifications.

The paging transmission may comprise a sequence of data symbols associated with a respective coverage class. Determining may comprise determining if the first sequence of data symbols is associated with the respective coverage class and, if so, receiving and decoding said paging message and, if not, at least one of stopping receiving remaining paging messages of the paging transmission, stopping decoding of paging message, and switching operation to an idle mode, i.e. a power saving mode.

The first sequence of data symbols may comprise a training sequence code associated with the respective coverage class.

Consider the scenario that two paging messages for devices belonging to different coverage classes are to be scheduled. In this case the BSS multiplexes them into the paging resource of their paging group. For instance the BSS may send both paging messages with different TSCs using QPSK (quadrature phase shift keying) modulation by default. Asynchronous QPSK (AQPSK) also can be applied because a devices may belong to different coverage classes. This embodiment also supports the inclusion of the 64 bit IMSI identifier in the paging message to each device.

With assignment of different TSCs to devices belonging to different coverage classes, multiplexing of such devices is possible, thus again mitigating the paging channel blocking problem.

As a device is assigned a TSC specific for its coverage class, known by the device, the decoding will be attempted only if the same TSC is detected in all the bursts belonging to the radio blocks corresponding to its coverage class. In case of poor radio channel conditions, the channel estimation quality is expected to be poor and hence the channel decoding can be avoided. This resolves the problem of wrong DSC declaration when devices belonging to a lower coverage class are scheduled and a device belonging to a higher coverage class monitors the paging blocks.

In order to overcome any loss due to orthogonal sub channel (OSC) multiplexing, for P-TMSI paging short message may be used with increased coding rate as suggested in earlier proposals.

When a user is paged using IMSI, the OSC multiplexing should not be done, instead only single user should be scheduled. Because, the paging message size is larger and the current amount of repetitions may not be sufficient for target coverage condition.

Figure 8:
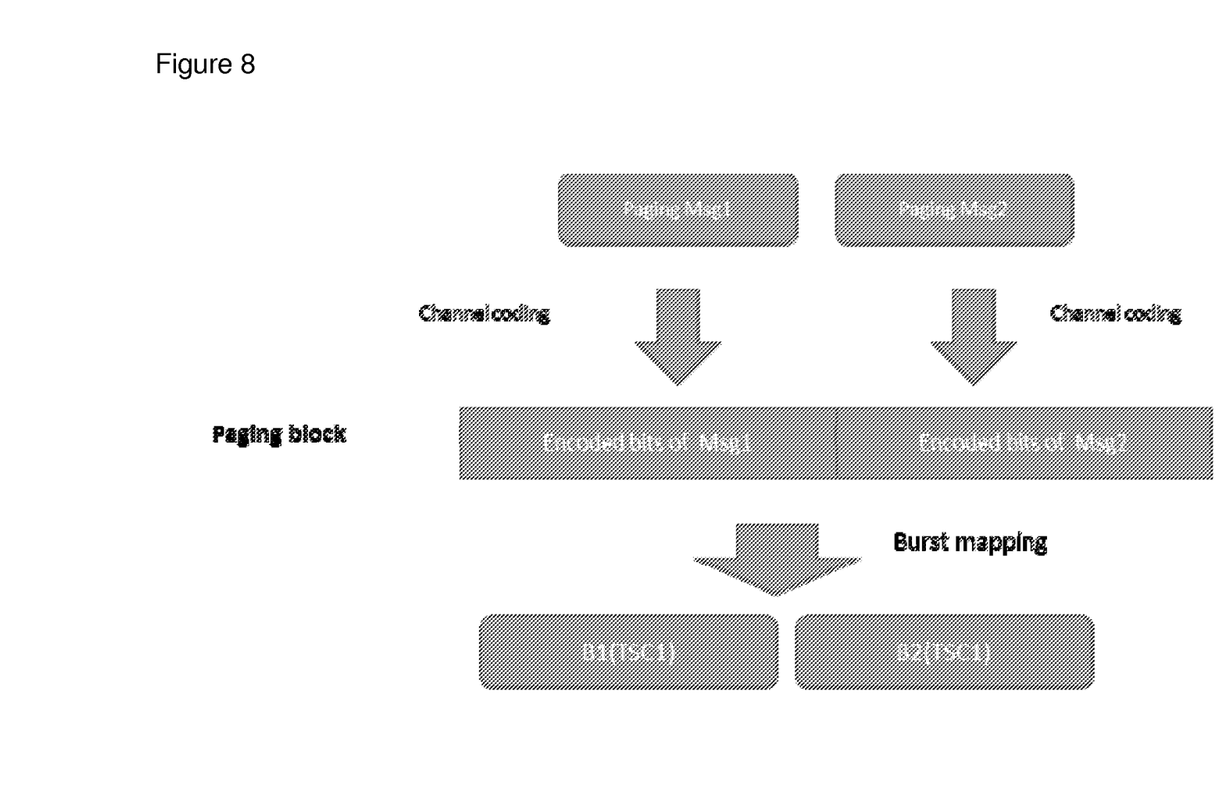
FIG. 8 shows a schematic diagram of a paging block.

FIG. 8 shows an example of a paging block according to an embodiment. The paging block comprises one block which is separately decodable unit. In EC-GSM one paging block maps to two bursts. A paging message is encoded in the paging block. In embodiments, a in a single paging block two separate decodable messages may be sent. The TSC of the paging block remains the same across all the repetitions of the block. Depending on coverage class, the paging block is repeated N times. Within the paging block, the first encoded bits always corresponds to lower CC. It repeats for M times as per CC. Second part of encoded bit corresponds to higher coverage class. This repeats for entire repetition of the paging block. TSC of the paging block is assigned as per CC of two messages getting multiplexed. In addition to TSC Stealing bit also can be used to identify the CC of the two messages. When single message is sent, TSC of block will map to one coverage class only.

In a further embodiment, the benefit of multiplexing paging requests to two devices belonging to different coverage classes may be combined along with the differentiation of the CC and multiplex option without the need to decode the paging block. The paging transmission may comprise an indication that the paging transmission comprises a plurality of encoded paging messages multiplexed in the block. The indication may include an indication of the respective coverage classes with which the plurality of encoded messages are associated. The indication comprises at least one of a training sequence code and a stealing bit.

In particular the TSC may indicate the multiplexing option. To achieve this, an indication, for instance by reusing stealing flags, is sent in such way that a device can identify whether its paging message is present in the paging block or not without the need to decode the paging message. UE Energy saving may achieved as UE can skip decoding based on TSC and multiplex indication MUX-IND. MUX-IND may be informed via stealing bit.

In a further embodiment this indication, for instance sent as stealing flag, indicates whether a paging block includes a paging message for more than one CC. In this case the TSC indicates the CC of the paging message for the first device. A combination of the stealing flag and the TSC may then indicate if a paging block includes one or 2 paging messages and the CC of the paging messages, eg., according to mapping in Table 1. The stealing flag may be one bit or several bits.

Table 1 shows an example of a training sequence code and stealing bit assignment for various multiplexing options.

TABLE 1

| Coverage class CC | Assignment of TSC and stealing bit (SB) | Multiplex option |
|---|---|---|
| CC1 | CC1-TSC1 | Always single paging message |
| CC2 | CC2-TSC1 + SB = 0 | single message |
|  | CC2-TSC1 + SB = 1 | Two message in same burst |
| CC3 | CC3-TSC1 | Single message |
|  | CC3-TSC2 (SB = 0) | Second message for CC1 |
|  | CC3-TSC2 (SB = 1) | Second message for CC2 |
| CC4 | CC4-TSC1 (SB = 0) | Single message |
|  | CC4-TSC1 (SB = 1) | Multiplexed with CC3 |
|  | CC4-TSC2 (SB = 0) | Multiplexed with CC2 |
|  | CC4-TSC2 (SB = 1) | Multiplexed with CC1 |

It should be understood that each block of the flowcharts of the Figures and any combination thereof may be implemented by various means or their combinations, such as hardware, software, firmware, one or more processors and/or circuitry.

Figure 9:
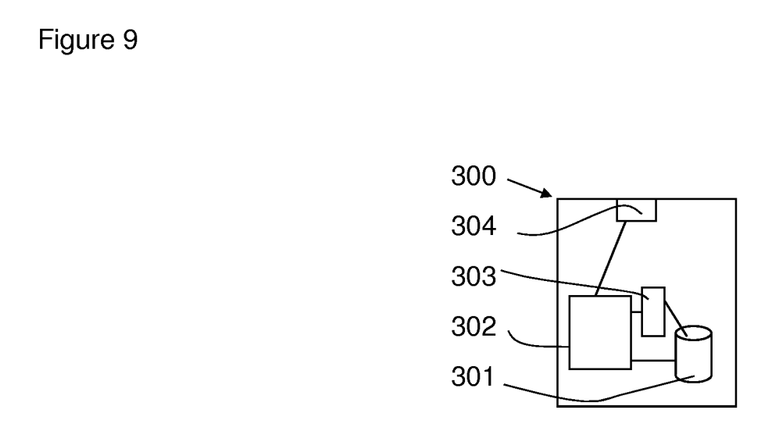
FIG. 9 shows a schematic diagram of an example control apparatus.

The method may be implemented on a mobile device as described with respect to FIG. 2 or control apparatus as shown in FIG. 9. FIG. 9 shows an example of a control apparatus for a communication system, for example to be coupled to and/or for controlling a station of an access system, such as a RAN node, e.g. a base station, (e) node B or 5G AP, a central unit of a cloud architecture or a node of a core network such as an MME or S-GW, a scheduling entity, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 201 can be configured to execute an appropriate software code to provide the control functions. Control functions may comprise receiving a paging transmission at a user device of a first coverage class, the paging transmission comprising a least one encoded paging message, the at least encoded one paging message associated with a respective coverage class and determining if the at least one paging message is associated with the first coverage class and, if so, receiving and decoding at least the paging message associated with the first coverage class.

Alternatively, or in addition, control functions may comprise providing a paging transmission to a user device of a first coverage class, the paging transmission comprising a least one encoded paging message, the at least one encoded paging message associated with a respective coverage class.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to UDN multi-connectivity systems, similar principles maybe applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
receiving a paging transmission at a user device of a first coverage class, wherein the paging transmission follows a number of repetitions in a downlink control information and comprises at least one encoded paging message, wherein the at least one encoded paging message is associated with a respective coverage class, and wherein a plurality of encoded paging messages are multiplexed in a resource block used for the paging transmission, wherein the multiplexing comprises an orthogonal sub channel multiplexing;
determining whether the at least one encoded paging message is associated with the first coverage class; and
decoding the at least one encoded paging message associated with the first coverage class.

2. The method according to claim 1, wherein the paging message transmission is a dual encoded paging message, and wherein each encoded part of the dual encoded paging message is associated with the respective coverage class.

3. The method according to claim 1, further comprising:
when the at least one encoded paging message is not associated with the first coverage class, stopping the decoding of the paging message or switching operation of the user device to an idle mode.

4. The method according to claim 1, wherein the paging transmission received at the user device is downlink control information.

5. A method comprising:
providing a paging transmission to a user device of a first coverage class, wherein the paging transmission follows a number of repetitions in a downlink control information and comprises at least one encoded paging message, wherein the at least one encoded paging message is associated with a respective coverage class, and wherein a plurality of encoded paging messages are multiplexed in a resource block used for the paging transmission, wherein the multiplexing comprises an orthogonal sub channel multiplexing.

6. The method according to claim 5, wherein the paging transmission is a dual encoded paging message, and wherein each encoded part of the dual encoded paging message is associated with the respective coverage class.

7. The method according to claim 5, wherein the paging transmission provided to the user device is downlink control information.

8. A computer program product embodied in a non-transitory computer-readable medium and encoding instructions that, when executed in hardware, perform a method according to claim 1.

9. An apparatus comprising:
at least one processor; and
at least one memory including a computer program code, wherein the at least one memory and the computer program code are configured to, with the at least one processor, cause the apparatus at least to:
receive a paging transmission of a first coverage class, wherein the paging transmission follows a number of repetitions in a downlink control information and comprises at least one encoded paging message, wherein the at least one encoded paging message is associated with a respective coverage class, and wherein a plurality of encoded paging messages are multiplexed in a resource block used for the paging transmission, wherein the multiplexing comprises an orthogonal sub channel multiplexing;
determine whether the at least one encoded paging message is associated with the first coverage class; and
decoding the at least one encoded paging message associated with the first coverage class.

10. The apparatus according to claim 9, wherein the paging transmission received at the apparatus is downlink control information.

11. The apparatus according to claim 9, wherein the at least one memory and the computer program code are also configured to, with the at least one processor, cause the apparatus at least to:
when the at least one encoded paging message is not associated with the first coverage class, stopping the decoding of the paging message or switching operation of the user device to an idle mode.

* * * * *